(12) United States Patent
Kohno et al.

(10) Patent No.: US 6,428,855 B1
(45) Date of Patent: Aug. 6, 2002

(54) PROCESS FOR PRODUCING GEL-COATED SEED

(75) Inventors: Yasushi Kohno; Kazuhiro Inose, both of Hyogo (JP)

(73) Assignee: Agritecno Yazaki Co., Ltd. (JP)

(*) Notice: Subject to any disclaimer, the term of this patent is extended or adjusted under 35 U.S.C. 154(b) by 0 days.

(21) Appl. No.: 09/579,353

(22) Filed: May 25, 2000

(30) Foreign Application Priority Data

Jun. 24, 1999 (JP) ............................................. 11-178519

(51) Int. Cl.$^7$ ............................. B05D 1/36; B05D 7/00
(52) U.S. Cl. ..................... 427/407.1; 427/212; 427/214; 427/301; 427/302; 427/333
(58) Field of Search .......................... 427/4, 212, 402, 427/407.1, 333, 301, 302, 303, 213.31, 213.32, 214

(56) References Cited

U.S. PATENT DOCUMENTS

| | | | | |
|---|---|---|---|---|
| 4,250,660 A | * | 2/1981 | Kitamura et al. | 47/57.6 |
| 4,808,430 A | * | 2/1989 | Kouno | 427/4 |
| 5,421,882 A | * | 6/1995 | Kouno et al. | 118/23 |

* cited by examiner

Primary Examiner—Shrive P. Beck
Assistant Examiner—William Phillip Fletcher, III
(74) Attorney, Agent, or Firm—Baker & Daniels

(57) ABSTRACT

A process for producing an excellent gel-coated seed, a coating gel-layer of which has a uniform thickness and hardness, is provided. The process for producing a gel-coated seed according to the present invention employs a gel-forming solution and a hardener for gelatinizing the gel-forming solution, wherein a seed is dipped into the gel-forming solution after the hardener adheres to the seed.

13 Claims, No Drawings

PROCESS FOR PRODUCING GEL-COATED SEED

BACKGROUND OF THE INVENTION

(1) Field of the Invention

This invention relates to a process for producing a gel-coated seed.

(2) Description of the Related Art

In recent years, a seed such as what is called "$F_1$," having an excellent gene has been commercially available on the basis of advancement in biotechnology. By employing such a seed, productivity has been remarkably improved and highly valuable farm produce has been yielded, attracting a considerable attention as a core technology for a rebirth of Japanese agriculture.

On the other hand, since such seeds are expensive, the seeds are required to be sown at a prescribed position in a field without wasting them and to germinate, grow and harvest securely. To meet with these requirements, a gel-coated seed has been developed, on which the present inventors have studied and proposed several techniques.

As disclosed in, for example, Japanese Patent Application No. H6-152068, a gel-coated seed is produced according to the steps of: dipping seeds into a gel-forming solution such as a sodium alginate aqueous solution; gathering the solution together with the seeds; dropping them into a gelatinizing solution containing, for example, calcium ions to form a coating gel-layer around each seed; and adjusting hardness of the coating gel-layer in the following washing step.

However, this process is time-consuming and some skillfulness is required in order to form a gel-coated seed in such a manner that one grain of seed is securely packed in one gel capsule and various controls and complex machines are needed for mechanization, causing such a gel-coated seed expensive after all.

In particular, it has been difficult to take out seeds dipped in a viscous gel-forming solution and to control a size of the gel-coated seed and a thickness of the coating gel-layer, therefore, hardness of the coating gel-layer has not been uniform causing from ununiformity in the thickness of the coating gel-layer, resulting in bad handling upon sowing, plugging in a sowing machine upon sowing by machine and a difficulty in secure sowing grain by grain. Furthermore, since the thickness and hardness of the coating gel-layer are not uniform, a germination rate has been low and a germination time has not been uniform from seed to seed.

In order to decrease the ununiformity in hardness of the coating gel-layer, a time for hardening and a time for washing can be adjusted, however, it is not practical to adjust the time for hardening and washing in accordance with each thickness of coating gel-layer of each seed.

SUMMARY OF THE INVENTION

It is therefore an objective of the present invention to solve the above problem and to provide a process for producing a gel-coated seed, by which an excellent gel-coated seed having a uniform thickness and hardness of the coating gel-layer can be produced.

In order to attain the above objective, the present invention is to provide a process for producing a gel-coated seed, employing a gel-forming solution and a hardener for gelatinizing the gel-forming solution, characterized in that a seed is dipped into the gel-forming solution after the hardener adheres to the seed.

DESCRIPTION OF THE PREFERRED EMBODIMENTS

A gel-forming solution used in a process for producing a gel-coated seed according to the present invention easily forms an aqueous gel by a hardener. The aqueous gel is relatively soft so that the aqueous gel neither adversely affect the seed nor prevent a plumule and radicle from growing. The gel-forming solution is a solution such as sodium alginate aqueous solution, sodium polyacrylate aqueous solution and sodium carboxymethyl cellulose (hereinafter, CMC-Na) aqueous solution.

The hardener for gelatinizing the gel-forming solution is a substance containing ions of bivalent metal such as calcium and barium (when sodium alginate or sodium polyacrylate aqueous solution is used as the gel-forming solution) or a substance containing aluminum ions (when CMC-Na aqueous solution is used as the gel-forming solution), wherein the substance is a salt such as chloride (solid) and lactate (solid) or an aqueous solution of the salt.

In the present invention, it is necessary that a seed be dipped into the gel-forming solution after the hardener adheres to the seed. Otherwise, neither an excellent effect of the present invention can be obtained nor a formation of the gel-coated seed itself can be attained according to circumstances.

In the present invention, adhesion of the hardener to the seed is easily carried out by spraying water onto the seed followed by adding a solid hardener and mixing, or dipping the seed into a liquid hardener followed by removing an excess hardener using a sieve and the like.

The seeds on which the hardener adheres are successively thrown into the gel-forming solution under stirring to form a coating gel-layer around the seed, then the gel-coated seeds are taken out from the gel-forming solution followed by washing.

During formation of the coating gel-layer, the formed gel-coated seeds possibly adheres with each other, and when the seeds rise to the surface partially coming out from a liquid level of the gel-forming solution, the coating gel-layer is not formed on a portion of the seed above the liquid level. In these cases, a sowing by machine might be impossible or a problem such as a lowering of a germination rate is often caused. Consequently, during the formation of the coating gel-layer, the gel-forming solution has to be well stirred so as to prevent the above problems from occurring.

The thickness and hardness of the coating gel-layer depend upon a concentration of the gel-forming solution and an adhesion amount of the hardener, and when these conditions are fixed, the thickness and hardness are determined by a dipping time of the seed into the gel-forming solution, therefore, the dipping time has to be adjusted according to a requirement. Thus formed gel-coated seeds are taken out from the gel-forming solution and immediately washed using water so as to remove unhardened gel-forming solution adhering around each gel-coated seed.

According to the present invention, no complicated equipment is needed, a relatively large quantity of the gel-coated seeds can be produced through simple steps such as throwing, stirring and washing, enabling a production at low cost. Further, the produced gel-coated seed has a uniform thickness of the coating gel-layer and hardness, enabling an easy sowing, a uniform germination, therefore, a simultaneous harvest, a good production efficiency and an easy mechanization for the harvest.

EXAMPLES

In the following, the process for producing the gel-coated seed according to the present invention is explained with examples.

A 10 wt%-calcium chloride aqueous solutinon as a hardener solution and a 3 wt%-sodium alginate aqueous solution as a gel-forming solution were prepared.

(Examination on Influence of Dipping Time in Gel-forming Solution)

Seeds of corn were dipped into the above hardener solution for 2 to 3 seconds so that the hardener solution adhered to each seed. Then, the seeds to which the hardener solution adheres were thrown into the above gel-forming solution. At this time, the gel-forming solution was stirred as slow as possible provided that the seeds rotate in the gel-forming solution without keeping floating. After a constant period of time, the seeds were taken out from the gel-forming solution and washed using water.

In this examination, the gel-coated seeds were produced varing the dipping times being 30, 60, 90, 120 and 150 minutes and then, thickness of the coating gel-layer was investigated. The result is shown in Table 1.

TABLE 1

| Dipping time (minute) | 30 | 60 | 90 | 120 | 150 |
|---|---|---|---|---|---|
| Thickness of coated gel-layer (mm) | 0.1 | 0.25 | 0.6 | 1.0 | 1.5 |

Table 1 reveals that the thickness of the coating gel-layer increases with increasing the dipping time. According to the repeated examinations, it was confirmed that the thickness of the coating gel-layer is nearly constant at a given dipping time and that an ununiformity of the thickness is considerably little. The hardness of the coating gel-layer was evaluated with respect to the gel-coated seeds dipped in the gel-forming solution for the same period of time by using a rheometer, revealing that an ununiformity of the hardness is also little. The ununiformity of the hardness of the gel-coated seed of the present invention was compared with that of gel-coated seed produced by a process (as disclosed in the Japanese Patent Application No. H6-152068) comprising the steps of: dipping seeds of corn into a gel-forming solution consisting of a sodium alginate aqueous solution; gathering the solution together with the seeds; and dropping them into a gelatinizing solution consisting of a calcium chloride solution. The result revealed that the ununiformity of the hardness of the gel-coated seed of the present invention was about half of that of the gel-coated seed produced according to the disclosure in the above prior art.

(Examination on Germination Rate)

Seeds of corn were dipped into the hardener solution for 2 to 3 seconds so that the hardener solution adhered to each seed. Then, the seeds to which the hardener solution adheres were thrown into the gel-forming solution. At this time, the gel-forming solution was stirred as slow as possible so that the seeds rotated in the gel-forming solution without keeping floating. After two hours, the seeds were taken out from the gel-forming solution and washed using water to obtain gel-coated corn seed (A).

Then, gel-coated corn seed (B) produced according to the disclosure in the prior art (i.e. the Japanese Patent Application No. H6-152068) and bare corn seed (C) without coating treatment are prepared.

A germination rate for these three kinds of seed was investigated.

The two hundred grains of each seed were divided into four groups consisting of fifty grains and put (sown) on four petri dishes of 120 mm diameter, on which two filter papers were put one on top of the other, then put into a temperature controlled bath of 30° C. and then, a germination rate thereof was investigated. Here, 12 mL of water was added into the petri dishes on which the bare corn seeds (C) were put.

In the examination, the germination of the gel-coated seed was defined as such that a germ or root protrudes from the coating gel-layer. Change in the germination rate for each seed after the sowing is shown in Table 2. Numerical values in Table 2 are rounded off to zero decimal place.

TABLE 2

|  |  | 1st day | 2nd day | 3rd day | 7th day |
|---|---|---|---|---|---|
| Example | gel-coated corn seed (A) | 52% | 79% | 93% | 95% |
| Comparative Example 1 | gel-coated corn seed (B) | 48% | 73% | 77% | 80% |
| Comparative Example 2 | bare corn seed (C) | 14% | 80% | 98% | 98% |

Table 2 reveals that a germination time of the gel-coated seed (A) according to the present invention is earlier than that of the bare corn seed (C), furthermore, a final germination rate (a germination rate at 7 th day after sowing) of the gel-coated seed (A) is comparable to that of the bare corn seed (C).

In addition, it was confirmed that a average hardness of the coating gel-layer of the gel-coated seed (B) is comparable to that of the gel-coated seed (A), however, that the hardness of the coating gel-layer of the gel-coated seed (B) varies widely, wherein a germination rate of the seed (B) having relatively hard coating gel-layer tends to be low. On the other hand, the hardness of the coating gel-layer of the gel-coated seed (A) according to the present invention is relatively uniform and this seems to be a reason why such a high final germination rate is attained with respect to the gel-coated seed (A).

Accordingly, it is confirmed that employing the process for producing a gel-coated seed according to the present invention can attain early germination, uniform germination time and high germination rate.

According to the process for producing a gel-coated seed of the present invention, a mass production is easily carried out without employing expensive equipment and an excellent gel-coated seed, the coating gel-layer of which has a uniform thickness and hardness, can be produced.

What is claimed is:

1. A process for producing a gel-coated seed, employing a gel-forming solution and a hardener for gelatinizing the gel-forming solution, characterized in that a seed is dipped into the gel-forming solution after the hardener adheres to the seed.

2. The process for producing a gel-coated seed according to claim 1, wherein the gel-forming solution is sodium alginate aqueous solution or sodium polyacrylate aqueous solution and the hardener is a salt containing divalent metal ions or an aqueous solution of the salt.

3. The process for producing a gel-coated seed according to claim 2, wherein the divalent metal ions are calcium or barium ions.

4. The process for producing a gel-coated seed according to claim 1, wherein the gel-forming solution is sodium carboxymethyl cellulose aqueous solution and the hardener is a salt containing aluminum ions or an aqueous solution of the salt.

5. The process for producing a gel-coated seed as in claim 2, wherein the salt is chloride or lactate.

6. The process for producing a gel-coated seed according to claim 1, wherein the adhesion is carried out by spraying water onto the seed followed by adding the solid hardener and mixing.

7. The process for producing a gel-coated seed according to claim 1, wherein the adhesion is carried out by dipping the seed into the liquid hardener followed by removing the excess hardener.

8. The process for producing a gel-coated seed according to claim 1, wherein the dip is carried out by successively throwing the seeds on which the hardener adheres into the gel-forming solution under stirring.

9. The process for producing a gel-coated seed according to claim 8, wherein the stirring is sufficiently carried out as slow as possible provided that the seed on which the hardener adheres rotates in the gel-forming solution and remains completely submerged therein.

10. The process for producing a gel-coated seed according to claim 1, wherein a thickness and hardness of a coating gel-layer of the gel-coated seed are controlled by a dipping time of the seed on which the hardener adheres into the gel-forming solution.

11. The process for producing a gel-coated seed according to claim 1, wherein the process for producing a gel-coated seed further comprises a step of washing the gel-coated seed by water immediately after the gel-coated seed is taken out from the gel-forming solution.

12. The process for producing a gel-coated seed as in claim 3, wherein the salt is chloride or lactate.

13. The process for producing a gel-coated seed as in claim 4, wherein the salt is chloride or lactate.

* * * * *